(12) United States Patent
Rapaka et al.

(10) Patent No.: US 9,854,253 B2
(45) Date of Patent: Dec. 26, 2017

(54) METHOD FOR MOTION VECTOR DIFFERENCE (MVD) AND INTRA BLOCK COPY VECTOR DIFFERENCE (BVD) CODING OF SCREEN CONTENT VIDEO DATA

(71) Applicant: QUALCOMM Incorporated, San Diego, CA (US)

(72) Inventors: Krishnakanth Rapaka, San Diego, CA (US); Marta Karczewicz, San Diego, CA (US); Chao Pang, San Diego, CA (US); Joel Sole Rojals, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 285 days.

(21) Appl. No.: 14/750,935

(22) Filed: Jun. 25, 2015

(65) Prior Publication Data
US 2015/0382010 A1    Dec. 31, 2015

Related U.S. Application Data

(60) Provisional application No. 62/019,239, filed on Jun. 30, 2014, provisional application No. 62/041,527, filed on Aug. 25, 2014.

(51) Int. Cl.
*H04N 19/513* (2014.01)
*H04N 19/176* (2014.01)
(Continued)

(52) U.S. Cl.
CPC ........... *H04N 19/176* (2014.11); *H04N 19/13* (2014.11); *H04N 19/139* (2014.11); *H04N 19/184* (2014.11); *H04N 19/52* (2014.11)

(58) Field of Classification Search
CPC .... H04N 19/13; H04N 19/139; H04N 19/176; H04N 19/184; H04N 19/52
(Continued)

(56) References Cited

U.S. PATENT DOCUMENTS

2005/0253740 A1* 11/2005 Marpe ............... H03M 7/40
                                                       341/50
2007/0080832 A1*  4/2007 Yang ............... H03M 7/4006
                                                       341/50
(Continued)

FOREIGN PATENT DOCUMENTS

WO    WO-2012172113 A1    12/2012

OTHER PUBLICATIONS

International Search Report and Written Opinion—PCT/US2015/038076—ISA/EPO—Nov. 10, 2015.
(Continued)

*Primary Examiner* — Francis G Geroleo
(74) *Attorney, Agent, or Firm* — Knobbe, Martens, Olson & Bear, LLP

(57) ABSTRACT

A method for motion vector difference (MVD) coding of screen content video data is disclosed. In one aspect, the method includes determining an MVD between a predicted motion vector and a current motion vector and generating a binary string comprising n bins via binarizing the MVD. The method further includes determining whether an absolute value of the MVD is greater than a threshold value and encoding a subset of the n bins via an exponential Golomb code having an order that is greater than one in response to the absolute value of the MVD being greater than the threshold value.

25 Claims, 8 Drawing Sheets

(51) Int. Cl.
*H04N 19/13* (2014.01)
*H04N 19/52* (2014.01)
*H04N 19/139* (2014.01)
*H04N 19/184* (2014.01)

(58) Field of Classification Search
USPC .................................................. 375/240.16
See application file for complete search history.

(56) References Cited

U.S. PATENT DOCUMENTS

| | | | | | |
|---|---|---|---|---|---|
| 2009/0096643 | A1* | 4/2009 | Chang | ................. | H03M 7/4006 341/51 |
| 2012/0300839 | A1* | 11/2012 | Sze | ..................... | H04N 19/91 375/240.12 |
| 2013/0027230 | A1* | 1/2013 | Marpe | ................. | H03M 7/4006 341/107 |
| 2013/0170553 | A1 | 7/2013 | Chen et al. | | |
| 2013/0272377 | A1* | 10/2013 | Karczewicz | ............ | H03M 7/30 375/240.02 |
| 2014/0177707 | A1* | 6/2014 | George | ................. | H04N 19/52 375/240.03 |
| 2015/0264355 | A1* | 9/2015 | Hsiang | ................ | H04N 19/517 375/240.02 |
| 2015/0264386 | A1* | 9/2015 | Pang | .................... | H04N 19/513 375/240.16 |

OTHER PUBLICATIONS

Karczewicz M., et al., "Non-SCCE1: Block vector coding for Intra block copy", 18. JCT-VC Meeting; Jun. 30, 2014-Sep. 7, 2014; SAPPORO; (Joint Collaborative Team on Video Coding of ISO/IEC JTC1/SC29/WG11 and ITU-T SG.16 ) ; URL: http://wftp3.itu.int/av-arch/jctvc-site/, No. JCTVC-R0181v2, Jun. 21, 2014 (Jun. 21, 2014), pp. 1-8; XP030116470, Chapter 1.

Rapaka K., et al., "CE1 : Results of Test 1.1, Test 2.1 and Test 3.1", 19. JCT-VC Meeting; Oct. 17, 2014-Oct. 24, 2014; Strasbourg; (Joint Collaborative Team on Video Coding of ISO/IEC JTC1/SC29/WG11 and ITU-T SG.16); URL: http://wftp3.itu.int/av-arch/jctvc-site/, No. JCTVC-S0142, Oct. 8, 2014 (Oct. 8, 2014), pp. 1-13; XP030116910, abstract Chapter 1.

* cited by examiner

METHOD FOR MOTION VECTOR DIFFERENCE (MVD) AND INTRA BLOCK COPY VECTOR DIFFERENCE (BVD) CODING OF SCREEN CONTENT VIDEO DATA

INCORPORATION BY REFERENCE TO PRIORITY APPLICATION(S)

This application claims the benefit of U.S. Provisional Application No. 62/019,239, filed Jun. 30, 2014 and U.S. Provisional Application No. 62/041,527, filed Aug. 25, 2014.

TECHNICAL FIELD

This disclosure relates to the field of video coding and compression, and particularly to techniques for motion vector difference (MVD) and intra block copy vector difference (BVD) coding for screen content video data.

BACKGROUND

Description of the Related Art

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

The encoding of a motion vector difference (MVD) may improve coding efficiency over the coding of a current motion vector. For example, a predicted motion vector may be generated based on previously calculated motion vectors, and the difference between the current motion vector and the predicted motion vector, that is, the MVD, may be coded. Similarly, the coding of an intra block copy block vector difference (BVD) may improve coding efficiency over the coding of a current intra block copy block vector.

SUMMARY

The systems, methods and devices of this disclosure each have several innovative aspects, no single one of which is solely responsible for the desirable attributes disclosed herein.

In one aspect, a method operable by a video encoder for encoding screen content comprises determining, via a motion estimation unit of the video encoder, a motion vector difference (MVD) between a predicted motion vector and a current motion vector of the screen content; generating a binary string comprising n bins via binarizing the MVD; encoding, via an entropy encoding unit of the video encoder, at least one bin of the n bins via a first entropy coding operation; determining whether an absolute value of the MVD is greater than a threshold value; and encoding, via the entropy encoding unit, a subset of the n bins associated with the screen content via a second entropy coding operation in response to the absolute value of the MVD being greater than the threshold value, the second entropy coding operation comprising an exponential coding having an order that is greater than one.

In another aspect, method operable by a video decoder for decoding screen content comprises receiving, via an entropy decoding unit of the video decoder, a bitstream comprising an encoded binary string, the binary string comprising n bins associated with the screen content; decoding, via the entropy decoding unit, at least one bin of the n bins via a first entropy coding operation, the at least one bin indicating whether an absolute value of an MVD is greater than a threshold value, the MVD being a difference between a predicted motion vector and a current motion vector; decoding, via the entropy decoding unit, a subset of the n bins via a second entropy coding operation in response to the at least one bin indicating that the absolute value of the MVD is greater than the threshold value, the second entropy coding operation comprising an exponential coding having an order that is greater than one; and generating, via a prediction processing unit of the video decoder, the MVD of the screen content based at least in part on the decoded bins.

In another aspect, device for encoding screen content comprises a memory configured to store the screen content; and a processor in communication with the memory and configured to: determine an MVD between a predicted motion vector and a current motion vector of the screen content; generate a binary string comprising n bins via binarizing the MVD; encode at least one bin of the n bins via a first entropy coding operation; determine whether an absolute value of the MVD is greater than a threshold value; and encode a subset of the n bins associated with the screen content via a second entropy coding operation in response to the absolute value of the MVD being greater than the threshold value, the second entropy coding operation comprising an exponential coding having an order that is greater than one.

In yet another aspect, a memory configured to store the screen content; and a processor in communication with the memory and configured to: receive a bitstream comprising an encoded binary string, the binary string comprising n bins associated with the screen content; decode at least one bin of the n bins via a first entropy coding operation, the at least one bin indicating whether an absolute value of an MVD is greater than a threshold value, the MVD being a difference between a predicted motion vector and a current motion vector; decode a subset of the n bins via a second entropy coding operation in response to the at least one bin indicating that the absolute value of the MVD is greater than the threshold value, the second entropy coding operation comprising an exponential coding having an order that is greater than one; and generate the MVD of the screen content based at least in part on the decoded bins.

DETAILED DESCRIPTION

Figure 1A:
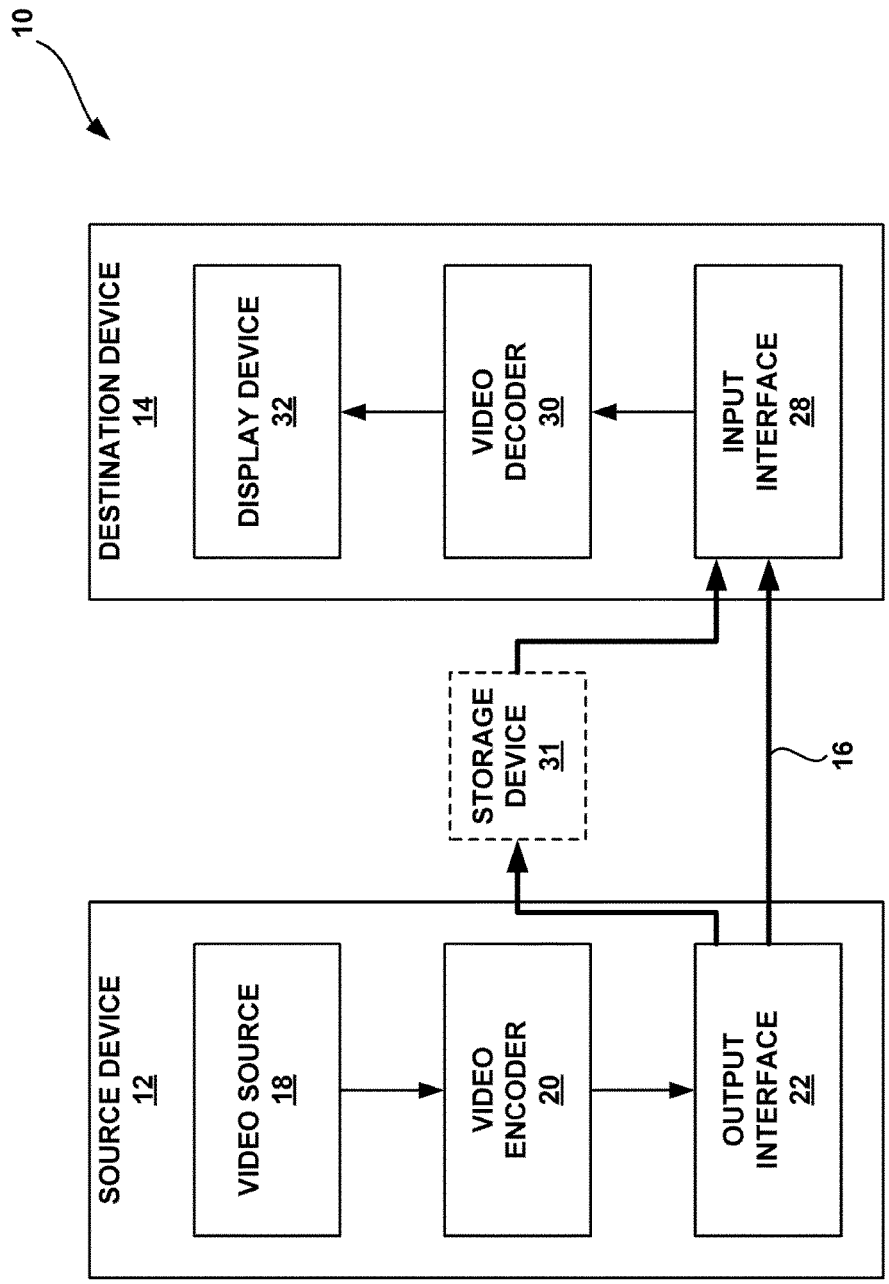
FIG. 1A is a block diagram illustrating an example video encoding and decoding system that may utilize techniques in accordance with aspects described in this disclosure.

In general, this disclosure relates to methods for motion vector difference (MVD) video coding for screen content video data. For many types of video data, such as camera-captured video data, there is a high probability that the current motion vector is highly correlated with a predicted motion vector. Accordingly, MVDs for these types of video data generally have small values. Thus, in certain video coding standards such as HEVC, MVDs may be coding using Exponential Golomb coding having an order of 1 so as to take advantage of the small average values of the MVDs. However, for screen content, such as computer generated video or rendered video, the predicted motion vector may not be as accurate as for camera-captured video, leading to larger MVDs. Since the number of bits required for Exponential Golomb coding increases exponentially with the size of the MVD, conventional coding methods may introduce coding inefficiencies when coding screen content.

Additionally, in certain coding implementations, the coding of MVDs and intra block copy block vector differences (BVDs) may employ different binarization methods. This has been traditionally motivated by the different statistical characteristics between MVDs and BVDs. However, there may be benefits to a more unified coding technique to be applied to the coding of both MVDs and BVDs.

Certain embodiments of this disclosure address the above-indicated inefficiencies in coding screen content MVDs and BVDs. For example, certain aspects of this disclosure relate to the coding of screen content using higher-order Exponential Golomb coding. This can improve the coding efficiency of MVDs for screen content.

In the description below, H.264/Advanced Video Coding (AVC) techniques related to certain embodiments are described; the HEVC standard and related techniques are also discussed. While certain embodiments are described herein in the context of the HEVC and/or H.264 standards, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the range extension.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), and HEVC including the range extension.

In addition, a video coding standard, namely HEVC, has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The range extension to HEVC is also being developed by the JCT-VC.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
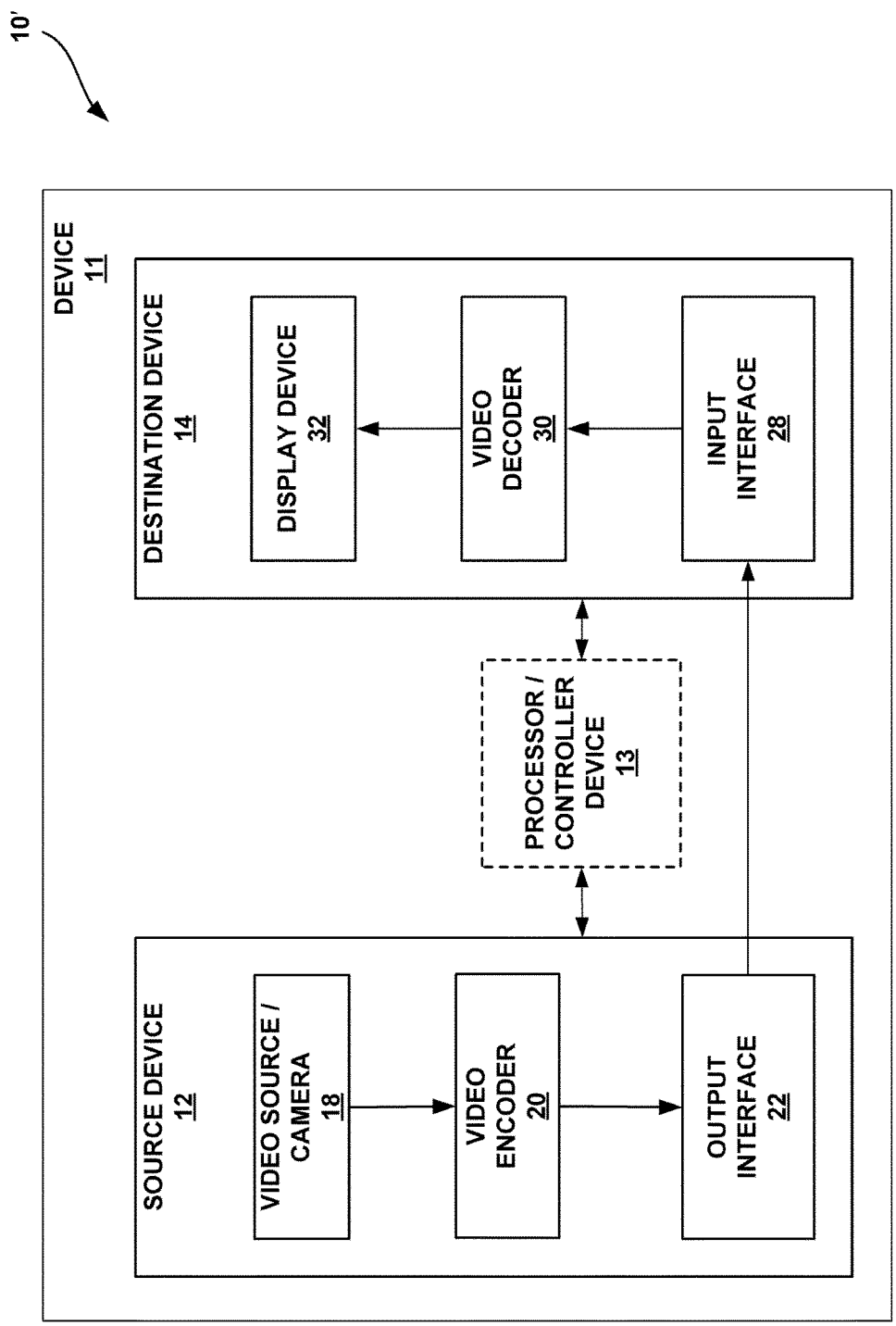
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2 or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3 or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a controller/processor device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, SEI, an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2:
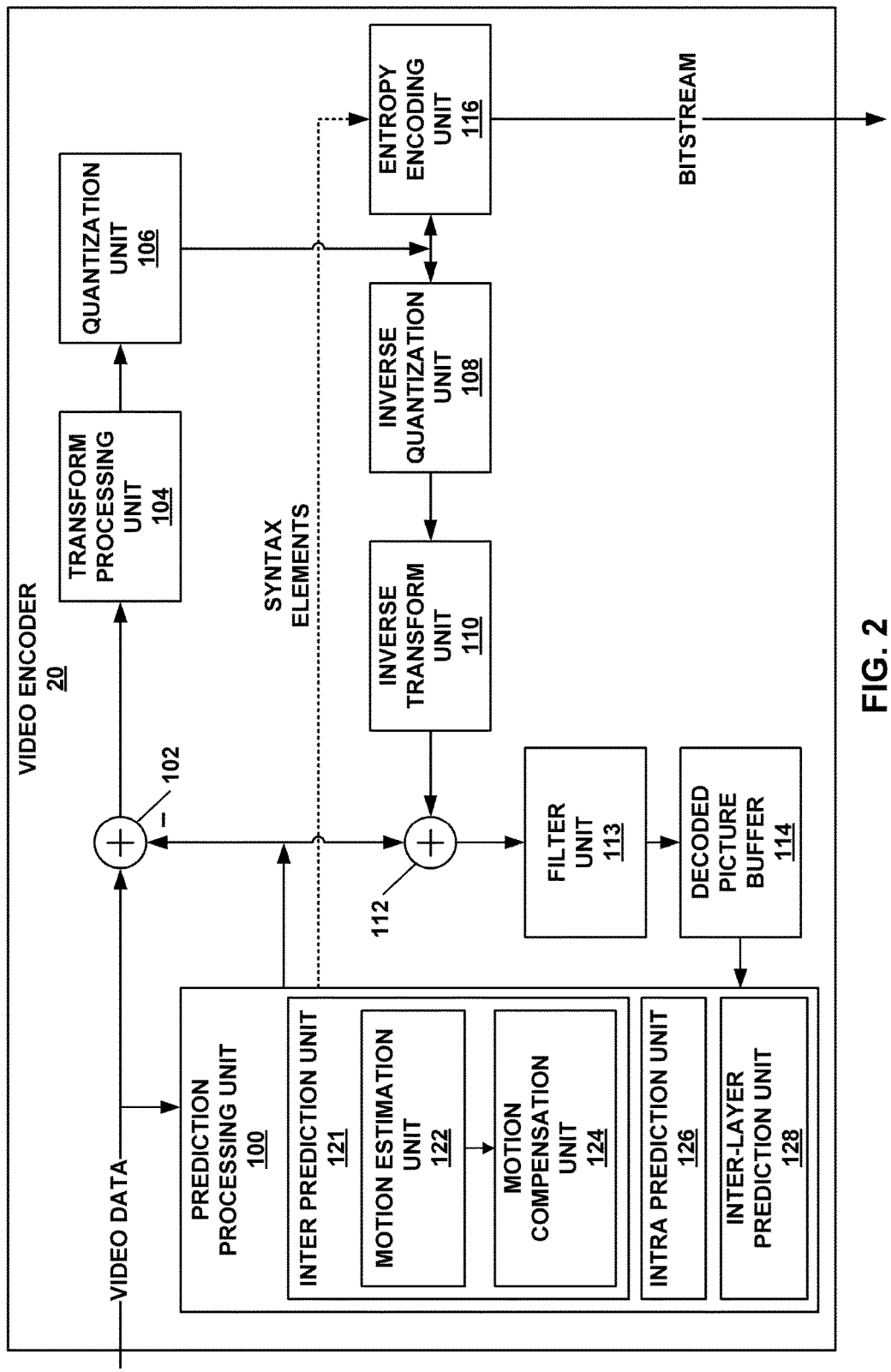
FIG. 2 is a block diagram illustrating an example of a video encoder that may implement techniques in accordance with aspects described in this disclosure.

FIG. 2 is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2 is for a single layer codec. However, in certain embodiments, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2 separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and an MVD. The MVD indicates a difference between the motion vector of the PU (i.e., a current motion vector) and the motion vector of the indicated neighboring PU (i.e., a predicted motion vector). The video decoder 30 may use the motion vector of the indicated neighboring PU and the MVD to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
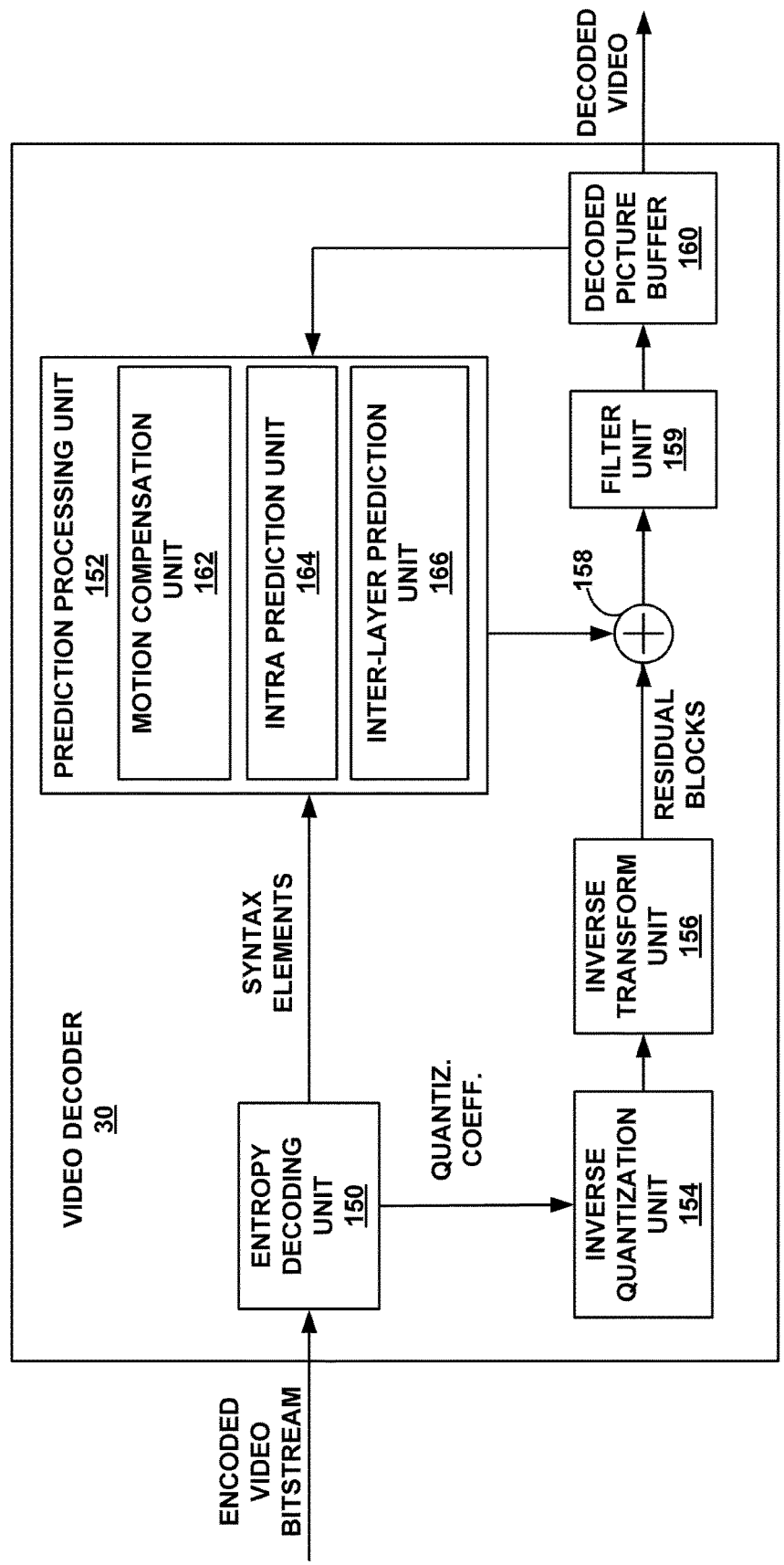
FIG. 3 is a block diagram illustrating an example of a video decoder that may implement techniques in accordance with aspects described in this disclosure.

FIG. 3 is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3 is for a single layer codec. However, in certain implementations, some or all of the video decoder 30 may be duplicated for processing of a multi-layer codec.

In the example of FIG. 3, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed in further detail below.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

MVD and BVD Coding

In existing approaches to HEVC, MVDs are coded in the same way regardless of the type of content (e.g., screen content or camera-captured content). For example, a first flag may be coded to indicate whether the absolute value of the MVD is zero. When the absolute value of the MVD is not zero, a second flag may be coded to indicate whether the absolute value of the MVD is greater than one. When the absolute value of the MVD is greater than one, the absolute value of the MVD minus one may be coded using bypass Exponential Golomb coding with an order of one.

Further, in existing approaches to HEVC and its extensions, BVDs are coded using a different approach from MVDs. For example, a first flag may be coded to indicate whether the BVD is zero. When the BVD is not zero, a remaining absolute value of the BVD may be coded using bypass Exponential Golomb coding with an order of three. For example, the remaining absolute value of the BVD may be the absolute value of the BVD minus one.

Exponential Golomb codes include a prefix value and a suffix value. The prefix value may be unary coded and the suffix value may be fixed length coded, where the length of the fixed length suffix value is based on the corresponding prefix value. Table 1 below illustrates an example of the coding of base values using an Exponential Golomb code with an order of four. In Table 1, the prefix and suffix value are separated by a dash.

TABLE 1

| | Exponential Golomb code Prefix-suffix |
|---|---|
| 0 | 0-0000 |
| 1 | 0-0001 |
| 2 | 0-0010 |
| 3 | 0-0011 |
| 4 | 0-0100 |
| 5 | 0-0101 |
| 6 | 0-0110 |
| 7 | 0-0111 |
| 8 | 0-1000 |
| 9 | 0-1001 |
| 10 | 0-1010 |
| 11 | 0-1011 |
| 12 | 0-1100 |
| 13 | 0-1101 |
| 14 | 0-1110 |
| 15 | 0-1111 |
| 16 | 10-00000 |
| 17 | 10-00001 |
| 18 | 10-00010 |
| 19 | 10-00011 |
| 20 | 10-00100 |
| 21 | . . . |
| 22 | . . . |

As discussed above, the encoding of screen content MVDs using Exponential Golomb coding with an order of one may lead to coding inefficiencies. Specifically, the number of bits required by Exponential Golomb coding increases exponentially with the size of the MVD. The MVDs of camera-captured video data have a probability distribution which decays rapidly for high values. Accordingly, using Exponential Golomb coding with an order of one is efficient for camera-captured video data since lower order Exponential Golomb codes are more efficient for smaller values.

In contrast, the MVDs of screen content have a substantially flat probability distribution (i.e., the probability for each value of the MVD is similar). This is because the motion vectors for screen content are not as reliably predicable as for camera-captured content. For example, screen content may include text characters and one of the text characters may be located at any position of the image in the next frame. Accordingly, when encoding the higher value MVDs using Exponential Golomb coding having an order of one, the coding efficiency decreases. Thus, according to aspects of the disclosure, when encoding screen content, MVDs that are greater than a threshold may be encoded using higher-order Exponential Golomb coding. Higher-order Exponential Golomb coding may have increased efficiency for higher value inputs (i.e., MVDs) at the expense of coding efficiency for lower value inputs.

Various implementations in accordance with this disclosure are described hereinafter. These embodiments may be implemented separately or jointly with other aspects of this disclosure. Further, the embodiments of this disclosure may also be applicable to other coding tools, such as 1-D dictionaries, palettes, etc.

Figure 4:
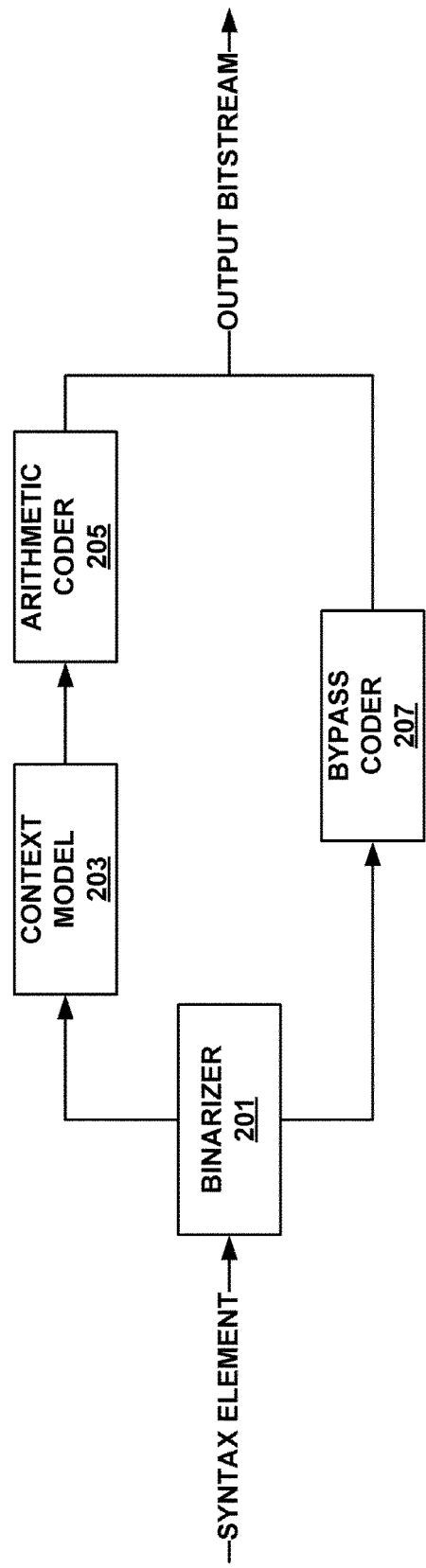
FIG. 4 is a block diagram illustrating a method for motion vector difference coding in accordance with aspects described in this disclosure.

FIG. 4 is a block diagram illustrating an example technique for motion vector difference coding in accordance with aspects described in this disclosure. Specifically, FIG. 4 illustrates a modified CABAC technique which may be used for MVD coding. The block diagram of FIG. 4 includes a binarizer 201, a context model 203, an arithmetic coder 205, and a bypass coder 207. As shown in FIG. 4, a syntax element, for example, an MVD, is received by the binarizer 201 as an input. The binarizer 201 generates a binary string from the MVD, the binary string including a plurality of bins. The binarizer 201 selectively sends each of the bins to either the context model 203 or the bypass coder 207. The context model 203 determines a context for each bin received from the binarizer 201. As described in further detail below, the context may be based on whether the bin is part of a horizontal or vertical component of the MVD. The arithmetic coder 205 codes the bins received from the context model 203 using arithmetic coding. The bypass coder 207 codes the bins received from the binarizer 201 without a context. Each of the arithmetic coder 205 and the bypass coder 207 outputs the respective coded bins to form an output bitstream. Although the above description of FIG. 4 has been described from the perspective of a CABAC encoding technique, the reverse technique may be employed to decode the bitstream.

Figure 5:
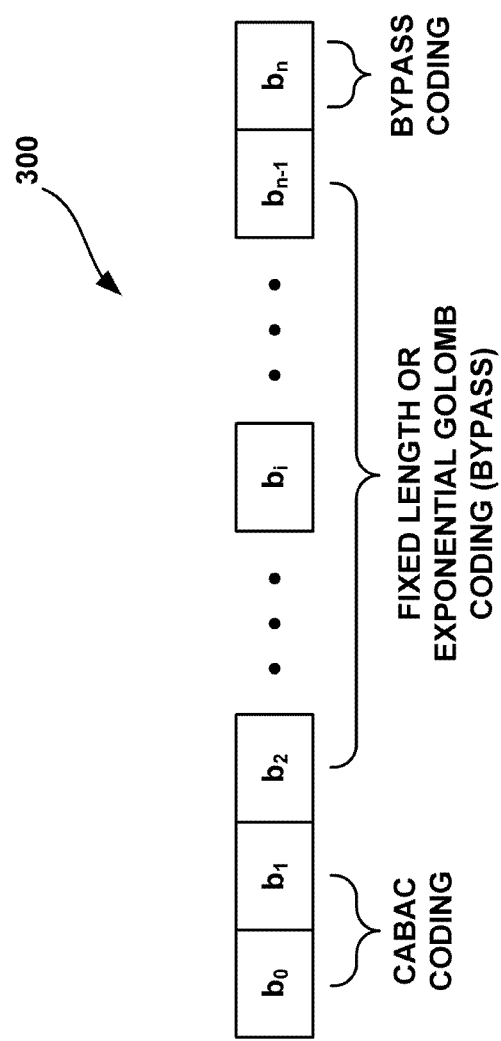
FIG. 5 is a diagram illustrating a binary string generated in accordance with aspects described in this disclosure.

FIG. 5 is a diagram illustrating an example binary string 300 generated in accordance with aspects described in this disclosure. The binary string 300 includes a plurality of bins $b_0, b_1, b_2, \ldots, b_i, \ldots, b_{n-1}$, and $b_n$. FIG. 5 includes descriptions of the types of coding that can be applied to each of the bins $b_0$ to $b_n$ in accordance with aspects of this disclosure. With reference to FIG. 4, the binarizer 201 sends each of the bins $b_0$ to $b_n$ to either the context model 203 or the bypass coder 207. Bins that are sent via the upper path to the context model 203 may be encoded using CABAC with a context. Bins that are sent via the lower path to the bypass coder 207 may bypass the CABAC to be coded without a context.

An embodiment of a method of encoding screen content MVDs according to the disclosure will now be described with reference to FIGS. 4 and 5. The first bin $b_0$ may indicate whether the absolute value of the MVD is greater than 0. The first bin $b_0$ may be encoded using CABAC with a context (i.e., via the context model 203 and the arithmetic coder 205). In certain implementations, the MVD may be divided into a horizontal component and a vertical component which are separately encoded. Thus, in one aspect of the disclosure, the context model 203 will use a different context for coding the first bin $b_0$ depending on whether the bin is included in a horizontal component or a vertical component of the MVD. However, in other aspects, the contexts for the horizontal and vertical components of the MVD are the same.

The second bin $b_1$ may indicate whether the absolute value of the MVD is greater than a threshold value k. In certain implementations, for example, when using an Exponential Golomb code having an order of 4, the threshold value may be 16 (i.e., $2^4$). In certain implementations, the threshold value k for a given Exponential Golomb order (EGOrder) may be determined by bit shifting a binary value of one to the left by EGOrder (i.e., 1<<EGOrder). The second bin $b_1$ may be encoded using CABAC with a context (i.e., via the context model 203 and the arithmetic coder 205). In one aspect of the disclosure, the context model 203 will use a different context for coding the second bin $b_1$ depending on whether the MVD is a horizontal component or a vertical component of the MVD. However, in other aspects, the contexts for the horizontal and vertical components of the MVD are the same.

In one implementation, the second bin $b_1$ is equal to zero when the absolute value of the MVD is less than the threshold value, and is equal to one when the absolute value of the MVD is greater than the threshold value. In these implementations, when the second bin $b_1$ is equal to zero, the bins $b_2$ to $b_{n-1}$ may be encoded using a fixed length code. The fixed length code may have a length equal to the threshold value k. When the second bin $b_1$ is equal to one, the bins $b_2$ to $b_{n-1}$ may represent the absolute value of the MVD minus the threshold value k minus 1. The bins $b_2$ to $b_{n-1}$ may be encoded by the bypass coder 207 using Exponential Golomb coding with an order that is greater than one. Further, modified Golomb codes, such as Rice Golomb codes, can also be used to encode bins $b_2$ to $b_{n-1}$. The last bin $b_n$ may indicate the sign of the MVD and may be encoded by the bypass coder 207 without a context.

The context model 203 may determine the context to be used in the coding using CABAC. In one implementation, the same context may be used for the same ordinal bins between the components of an MVD (i.e., $b_i$ for each of the horizontal and vertical components of the MVD may have the same context). In another implementation, the context is shared for each of the bins $b_0$ to $b_n$ which are coded using CABAC.

Although the above disclosure has been described in the context of coding MVDs, this disclosure is not limited thereto. In particular, the methods disclosed herein may also be applied to BVDs. Additionally, the decoding of the bitstream may be performed in the reverse order of the encoding techniques described with reference to FIGS. 4 and 5. For example, the bitstream may contain the encoded bins which may each be respectively decoded by the same technique in which they were encoded (i.e., bins $b_0$ and $b_1$ may be decoding using CABAC coding, bins $b_2$ through $b_{n-1}$ may be decoded using fixed length or exponential Golomb coding and bin bn may be decoded using bypass coding). A more detailed description of decoding techniques in accordance with this disclosure is given below in connection with FIG. 7.

MVD and BVD Coding Using Fixed Length Codes and Exponential Golomb Codes

In existing approaches, BVD and MVD are coded using different binarization techniques to code the vector differences. Specifically, MVD may be coded based on an inter prediction mode using the estimation from temporal pictures and BVD may be coded based on intra prediction using the estimation within the same picture. Accordingly, the statistical values for MVDs and BVDs (i.e., the expected distribution for values of MVDs and BVDs) may have different statistical characteristics. However, there may be various benefits to employing a unified design for inter and intra vector difference coding modes that makes up for these statistical differences. Further, the different binarization for MVDs and BVDs used in existing approaches imposes limits for such a unified design. Aspects of this disclosure relate to unified techniques that improve both BVD and MVD coding taking into their different statistical characteristics.

In some implementations, BVD and MVD coding may be performed using a combination of fixed length codes and Exponential Golomb codes. Below, examples of these implementations will be described using MVD coding as an example, however, these implementations may be also applied to BVDs.

In one implementation, an $n^{th}$ bin $b_n$ may be used to indicate the switching from fixed length codes to Exponential Golomb codes. For example, when the value of the MVD is greater than 4, the $n^{th}$ bin $b_n$ may be signaled as equal to one and the remaining value of the MVD (i.e., the value of MVD minus four) may be coded using an Exponential Golomb code with a predetermined order. When the value of the MVD is less than or equal to four, the MVD may be coded using a fixed length code.

This technique can be generalized to signaling that the MVD is greater than a threshold value N. For example, when the value of the MVD is greater than N, the $n^{th}$ bin $b_n$ may be signaled as equal to N and the remaining value of the MVD (i.e., the value of MVD minus N) may be coded using an Exponential Golomb code with a predetermined order. When the value of the MVD is less than or equal to N, the MVD may be coded using a fixed length code. The threshold value N may be selected from N=0, 1, 2, 3, 4 . . . . Different values of N may result in different binarization schemes and each of binarization scheme may work differently for different statistical values of the MVD.

Further, the length of the fixed length codes may be dependent on the value of N, e.g., the length of the fixed length codes length may be calculated as $\log_2 N$. In other implementations, truncated codes may be employed instead fixed length codes, for example, when the value of the MVD is less than or equal to N and N is not a power of two.

A more detailed example for MVD and BVD coding using an exemplary combination of fixed length codes and Exponential Golomb codes is provided below.

For MVD coding, a first bin $b_0$ may be used to indicate whether the value of MVD is greater than zero. A second bin $b_1$ may be used to indicate whether the value of MVD is greater than four. When the value of MVD is greater than four, the value of the MVD minus five may be coded using an Exponential Golomb code with an order of four. When the value of MVD is less than or equal to four, the value of the MVD minus one may be coded using bypass fixed length codes, each having a length of two.

A similar technique may be applied to BVD. A first bin $b_0$ may be used to indicate whether the value of BVD is greater than zero. A second bin $b_1$ may be used to indicate whether the value of BVD is greater than four. When the value of BVD is greater than four, the value of BVD minus 5 may be coded using an Exponential Golomb code with an order of four. When the value of BVD is less than or equal to four, the value of BVD minus one may be coded using bypass fixed length codes, each having a length of two.

Note that the above described techniques may be used separately for MVD and BVD coding, or used jointly as a unified method for MVD and BVD coding. Further, the first and/or second bins $b_0$ and/or $b_1$ may be coded in bypass mode or CABAC, as shown in FIG. 5. When the first and/or second bins $b_0$ and/or $b_1$ are coded in CABAC, the contexts for the first and/or second bins $b_0$ and/or $b_1$ may be different or the same for different components of BVD or MVD. When both the first and second bins $b_0$ and $b_1$ are coded in CABAC, the first and second bins $b_0$ and $b_1$ may use separate contexts or share the same contexts. Additionally, when coded in CABAC, the contexts of the first and/or second bins $b_0$ and/or $b_1$ for BVD and MVD may be separate or shared.

One implementation of the above techniques is shown in Table 2 below, which illustrates the corresponding binarization codes for MVD and/or BVD coding:

TABLE 2

| BVD/MVD Value | corresponding Binarization code |
|---|---|
| 0 | $0_R$ |
| 1 | $1_R0_R00$ |
| 2 | $1_R0_R01$ |
| 3 | $1_R0_R10$ |
| 4 | $1_R0_R11$ |
| 5 | $1_R1_R00000$ |
| 6 | $1_R1_R00001$ |
| 7 | $1_R1_R00010$ |
| 8 | $1_R1_R00011$ |
| 9 | $1_R1_R00100$ |
| 10 | $1_R1_R00101$ |
| 11 | $1_R1_R00110$ |
| 12 | $1_R1_R00111$ |
| 13 | $1_R1_R01000$ |
| 14 | $1_R1_R01001$ |
| 15 | $1_R1_R01010$ |
| 16 | $1_R1_R01011$ |
| 17 | ... |
| 18 | ... |

In the above Table 2, the subscript R represents regular coding bins (i.e., bins that are coded using a context).

MVD and BVD Coding Using Truncated Exponential Golomb Codes

In some implementations of this disclosure, BVD and MVD coding techniques may include using truncated Exponential Golomb codes. There are a number of differences between the truncated Exponential Golomb codes disclosed herein and existing Exponential Golomb codes.

The prefix codes of existing Exponential Golomb codes may be modified to be truncated unary codes over a specific interval in place of the unary codes used in Exponential Golomb codes. This interval may be signaled or may be fixed an entire slice, picture, and/or sequence. Additionally, a bin may be included to indicate the transition from the truncated unary prefix code to a regular Exponential Golomb prefix code. When the interval is signaled in the bitstream, the interval may be signaled at the granularity of a slice header, PPS, SPS, and/or VPS. In some implementations, the interval may be determined via a threshold, for example, truncated Exponential Golomb codes may be used when the absolute value of the MVD is less than or equal to a threshold value.

One technique for parsing truncated Exponential Golomb codes will now be described. The inputs to the parsing process may be bits that indicate a request for a binarization for a syntax element with a truncated Exponential Golomb with an order of zero. The outputs of the parsing process may be the truncated Exponential Golomb with an order of zero after the binarization of the syntax element.

The parsing process for the syntax elements coded using truncated Exponential Golomb codes may begin with reading the bits starting at the current location in the bitstream. The following psuedocode illustrates one implementation of the parsing process for truncated Exponential Golomb codes. For higher order truncated Exponential Golomb codes, the value leadingZeroBits may be higher order codes such as 2, 3, 4, etc.

If the first bin is zero, the parsing process for these syntax elements continues up to a value of MAX_BITS_TU_GROUP bins, and counts the number of leading bits that are equal to zero. This process may be specified as follows:

```
leadingZeroBits = 0
while((b==1) && (leadingZeroBits < MAX_BITS_TU_GROUP)) {
    b = read_bits( 1 );
    if(b){
        leadingZeroBits++;
        codeNum+=b<< leadingZeroBits;
    }
}
leadingZeroBits++;
codeNum += read_bits(leadingZeroBits );
``` where the value returned from read_bits(leadingZeroBits) may be interpreted as a binary representation of an unsigned integer with most significant bit written first.

```
If the first bin is non-zero:
    leadingZeroBits = 0 ;
    codeNum_Prefix = 0
    while(leadingZeroBits < MAX_BITS_TU_GROUP ) {
        leadingZeroBits++;
        codeNum_Prefix+=1<< leadingZeroBits;
    }
    leadingZeroBits++;
    codeNum_Prefix +=1<< leadingZeroBits;
```

The parsing process may follow a similar technique as Exponential Golomb codes having an order of K as described in earlier embodiments.

The variable codeNum may be assigned as follows:

$$\text{codeNum}=2^{leadingZeroBits}-1+\text{read\_bits(leadingZero-Bits)}+\text{codeNum\_Prefix}$$

Note that the above process may use ones and zeros having the opposite meaning for the prefix part and suffix part.

Also, the above process can also be generally extended to other order truncated Exponential Golomb codes.

An example for MVD/BVD coding using the truncated Exponential Golomb codes according to this disclosure will be described below.

For MVD coding, a first bin $b_0$ may indicate whether the value of MVD is greater than zero. A second bin $b_1$ may indicate whether the value of MVD is greater than N. When the value of MVD is greater than N, the value MVD minus N may be coded using truncated exponential Golomb codes with an order K. When the value of MVD is less than or equal to N, the value of MVD minus one may be coded using bypass fixed length codes having a length that may be dependent on N or the truncated codes.

A similar technique may be used for BVD coding. A first bin $b_0$ may indicate whether the value of BVD is greater than zero. A second bin $b_1$ may indicate whether the value of BVD is greater than N. When the value of BVD is greater than N, the value BVD minus N may be coded using truncated Exponential Golomb codes with an order K. When the value of BVD is less than or equal to N, the value of BVD minus one may be coded using bypass fixed length codes having a length that may be dependent on N or the truncated codes.

The above-described techniques may be used separately for MVD and BVD coding, or used jointly as a unified method for MVD and BVD coding. The first and/or second bins $b_0$ and/or $b_1$ may be coded in bypass mode or CABAC, as shown in FIG. 5. When the first and/or second bins $b_0$ and/or $b_1$ are coded in CABAC, the contexts may be different or the same for different components of BVD and/or MVD. When both the first and second bins $b_0$ and $b_1$ are coded in CABAC, the first and second bins $b_0$ and $b_1$ may use separate contexts or share the same contexts. Additionally, when coded in CABAC, the contexts of the first and/or second bins $b_0$ and/or $b_1$ for BVD and MVD may be separate or shared.

For the first bin $b_0$ in at least one implementation of the truncated Exponential Golomb codes, the first bin $b_0$ may be coded in bypass mode or CABAC. When the first bin $b_0$ is coded in CABAC, the contexts may be different or the same for different components of BVD or MVD. When the first bin $b_0$ is coded in CABAC, the contexts may be different or the same for different components of BVD or MVD. It is also possible to share the same context with the first and/or second bins $b_0$ and/or $b_1$ or use separate contexts. Additionally, when coded in CABAC, the contexts of the first bin $b_0$ in the proposed truncated Exponential Golomb codes for BVD and MVD may be separate or shared.

Example Flowchart for MVD or BVD Encoding of Screen Content

Figure 6:
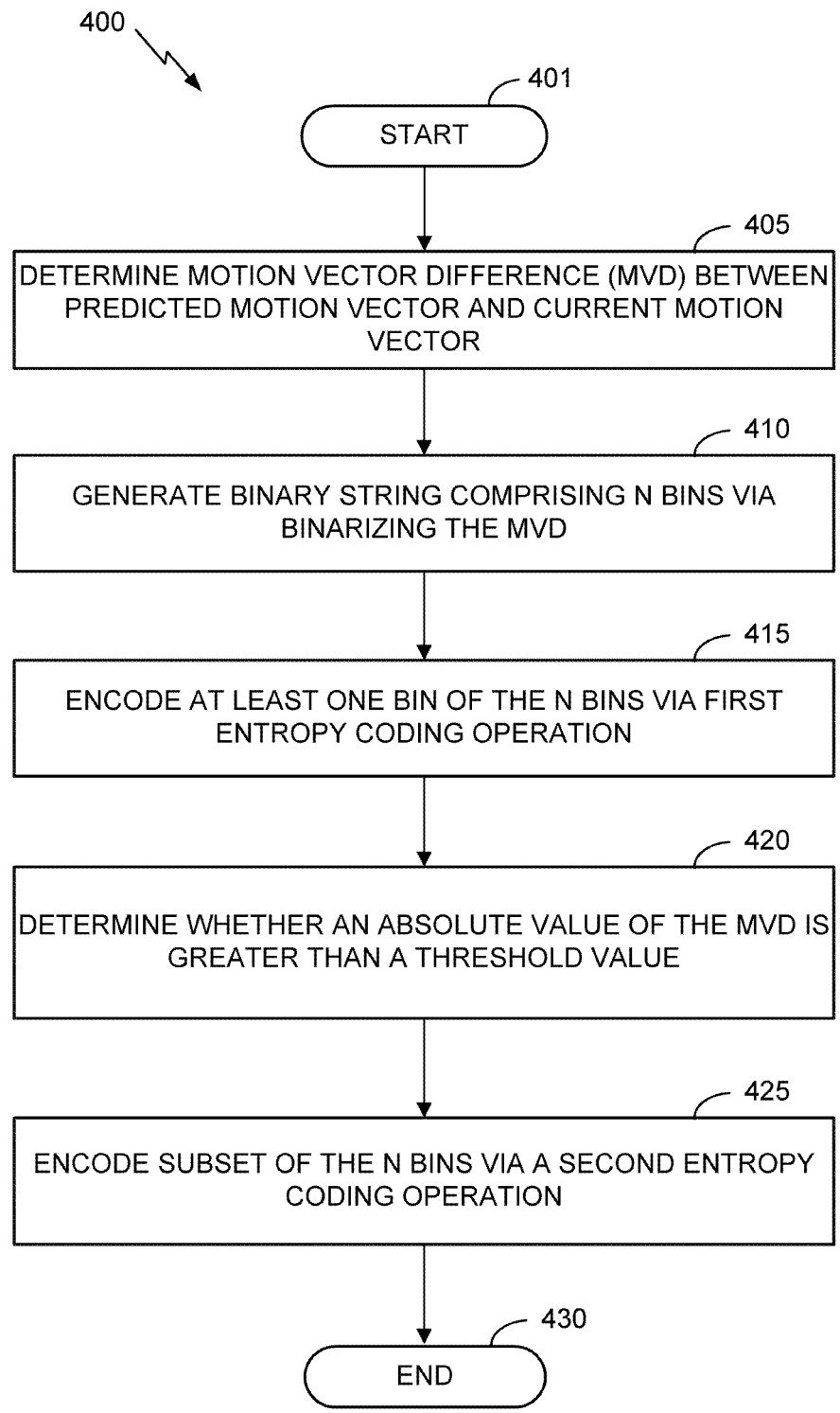
FIG. 6 is a flowchart illustrating a method for motion vector difference coding in accordance with aspects of the present disclosure.

With reference to FIG. 6, an example procedure for MVD (or BVD) encoding of screen content video data will be described. FIG. 6 is a flowchart illustrating a method 400 for MVD encoding of screen content in accordance with aspects of the present disclosure. The steps illustrated in FIG. 6 may be performed by a video encoder (e.g., the video encoder 20) or component(s) thereof. For convenience, method 400 is described as performed by a video coder (also simply referred to as coder), which may be the video encoder 20, or another component.

The method 400 begins at block 401. At block 405, the coder (e.g., the motion estimation unit 122 of the video encoder 20 shown in FIG. 2) determines an MVD between a predicted motion vector and a current motion vector. At block, 410, the coder generates a binary string comprising n bins via binarizing the MVD. The number of bins n may be greater than or equal to four. The number of bins n described in the method of FIG. 6 may be different from the index n described in connection with FIGS. 4 and 5.

At block 415, the coder (e.g., the entropy encoding unit 116 of the video encoder 20 shown in FIG. 2) encodes at least one bin of the n bins via a first entropy coding operation. The first entropy encoding operation may be CABAC. At block 420, the coder determines whether an absolute value of the MVD is greater than a threshold value. The threshold value may be equal to $2^k$. At block 425, the coder (e.g., the entropy encoding unit 116 of the video encoder 20 shown in FIG. 2) encodes a subset of the n bins via a second entropy coding operation in response to the absolute value of the MVD being greater than the threshold value. The second entropy coding operation may be an exponential coding operation having an order that is greater than one, such as an exponential Golomb code having an order, k, that is greater than one.

The coder may also encode each of the first, second and $n^{th}$ bins via CABAC or bypass coding. The first bin may identify whether the MVD is greater than 1. The second bin may identify whether the MVD is greater than $2^k$. The $n^{th}$ bin may represent the sign of the MVD. The method ends at block 430.

In the method 400, one or more of the blocks shown in FIG. 6 may be removed (e.g., not performed) and/or the order in which the method is performed may be switched. In some embodiments, additional blocks may be added to the method 400. The embodiments of the present disclosure are not limited to or by the example shown in FIG. 6, and other variations may be implemented in accordance with the present disclosure.

In certain aspects of the present disclosure, there is provided an apparatus comprising: means for determining a motion vector difference (MVD) between a predicted motion vector and a current motion vector of screen content; means for generating a binary string comprising n bins via binarizing the MVD; means for encoding at least one bin of the n bins via a first entropy coding operation; means for determining whether an absolute value of the MVD is greater than a threshold value; and means for encoding a subset of the n bins associated with the screen content via a second entropy coding operation in response to the absolute value of the MVD being greater than the threshold value, the second entropy coding operation comprising an exponential coding having an order that is greater than one.

In further aspects of the present disclosure, there is provided a non-transitory computer readable storage medium having stored thereon instructions that, when executed, cause a processor of a device to: determine a motion vector difference (MVD) between a predicted motion vector and a current motion vector of screen content; generate a binary string comprising n bins via binarizing the MVD; encode at least one bin of the n bins via a first entropy coding operation; determine whether an absolute value of the MVD is greater than a threshold value; and encode a subset of the n bins associated with the screen content via a second entropy coding operation in response to the absolute value of the MVD being greater than the threshold value, the second entropy coding operation comprising an exponential coding having an order that is greater than one.

Example Flowchart for MVD or BVD Decoding of Screen Content

Figure 7:
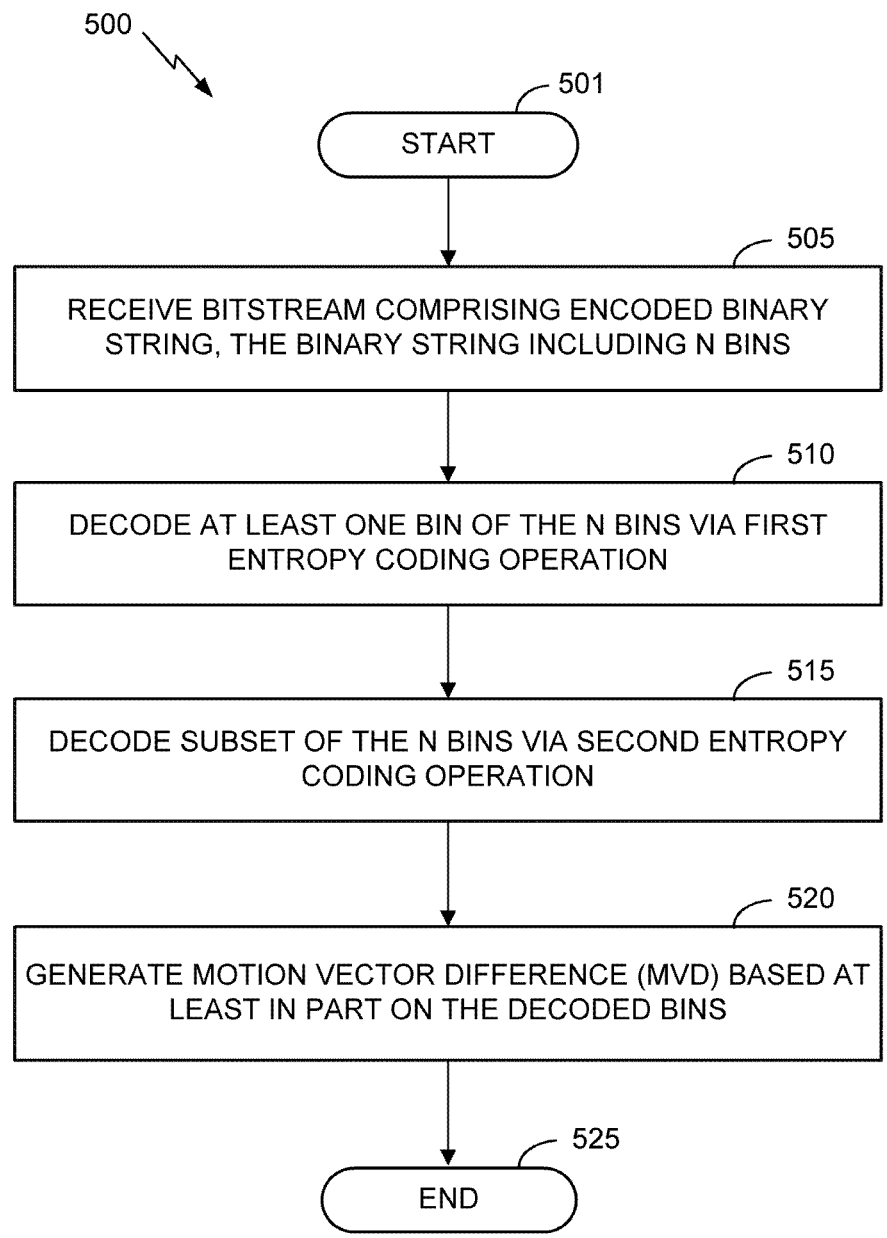
FIG. 7 is a flowchart illustrating a method for motion vector difference coding in accordance with aspects of the present disclosure.

With reference to FIG. 7, an example procedure for MVD (or BVD) decoding of screen content video data will be described. FIG. 7 is a flowchart illustrating a method 500 for MVD decoding of screen content in accordance with aspects of the present disclosure. The steps illustrated in FIG. 7 may be performed by a video decoder (e.g., the video decoder 30) or component(s) thereof. For convenience, method 500 is described as performed by a video coder (also simply referred to as coder), which may be the video encoder 30, or another component.

The method 500 begins at block 501. At block 505, the coder (e.g., the entropy decoding unit 150 of the video decoder 30 shown in FIG. 3) receives a bitstream comprising an encoded binary string, the binary string comprising n bins. At block 510, the coder (e.g., the entropy decoding unit 150 of the video decoder 30 shown in FIG. 3) decodes at least one bin of the n bins via a first entropy coding operation. The first entropy encoding operation may be CABAC. The at least one bin may indicate whether an absolute value of an MVD is greater than a threshold value. The MVD may be a difference between a predicted motion vector and a current motion vector. The number of bins n may be greater than or equal to four. The number of bins n described in the method of FIG. 7 may be different from the index n described in connection with FIGS. 4 and 5.

At block 515, the coder (e.g., the entropy decoding unit 150 of the video decoder 30 shown in FIG. 3) decodes a subset of the n bins via a second entropy coding operation in response to the at least one bin indicating that the absolute value of the MVD is greater than the threshold value. The threshold value may be equal to $2^k$. The second entropy coding operation may comprise an exponential coding having an order that is greater than one. The second entropy coding operation may be an exponential coding operation having an order that is greater than one, such as an exponential Golomb code having an order, k, that is greater than one. At block 520, the coder (e.g., the prediction processing unit 152 of the video decoder 30 shown in FIG. 3) generates the MVD based at least in part on the decoded bins. The method ends at block 525.

In the method 500, one or more of the blocks shown in FIG. 7 may be removed (e.g., not performed) and/or the order in which the method is performed may be switched. In some embodiments, additional blocks may be added to the method 500. The embodiments of the present disclosure are not limited to or by the example shown in FIG. 7, and other variations may be implemented in accordance with the present disclosure.

In certain aspects of the present disclosure, there is provided an apparatus comprising: means for receiving a bitstream comprising an encoded binary string, the binary string comprising n bins associated with screen content; means for decoding at least one bin of the n bins via a first entropy coding operation, the at least one bin indicating whether an absolute value of an MVD is greater than a threshold value, the MVD being a difference between a predicted motion vector and a current motion vector; means for decoding a subset of the n bins via a second entropy coding operation in response to the at least one bin indicating that the absolute value of the MVD is greater than the threshold value, the second entropy coding operation comprising an exponential coding having an order that is greater than one; and means for generating the MVD of the screen content based at least in part on the decoded bins.

In further aspects of the present disclosure, there is provided a non-transitory computer readable storage medium having stored thereon instructions that, when executed, cause a processor of a device to: receive a bitstream comprising an encoded binary string, the binary string comprising n bins associated with screen content; decode at least one bin of the n bins via a first entropy coding operation, the at least one bin indicating whether an absolute value of an MVD is greater than a threshold value, the MVD being a difference between a predicted motion vector and a current motion vector; decode a subset of the n bins via a second entropy coding operation in response to the at least one bin indicating that the absolute value of the MVD is greater than the threshold value, the second entropy coding operation comprising an exponential coding having an order that is greater than one; and generate the MVD of the screen content based at least in part on the decoded bins.

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method operable by a video encoder for encoding screen content, the method comprising:
   determining a motion vector difference (MVD) between a predicted motion vector and a current motion vector;
   generating a binary string comprising n bins via binarizing the MVD;
   encoding at least one bin of the n bins via a first entropy coding operation;
   determining whether an absolute value of the MVD is greater than a threshold value;
   encoding a subset of the n bins via a second entropy coding operation in response to the absolute value of the MVD being greater than the threshold value, the second entropy coding operation comprising an exponential coding having an order that is greater than one; and
   encoding the subset of n bins using a fixed length code in response to the absolute value of the MVD being less than or equal to the threshold value;
   wherein the at least one bin comprises first and second bins, the first bin indicating whether the absolute value of the MVD is greater than zero;
   wherein the subset of the n bins comprises third through n-1$^{th}$ bins of the n bins, and wherein the length of the fixed length code is dependent on the threshold value.

2. The method of claim 1, wherein:
   the first entropy coding operation comprises Context Adaptive Binary Arithmetic Coding (CABAC); and
   the second entropy coding operation comprises an exponential Golomb coding.

3. The method of claim 2, further comprising determining a context for each of the at least one bin based on whether the MVD is a horizontal component MVD or a vertical component MVD.

4. The method of claim 1, wherein the second bin indicates whether the absolute value of the MVD is greater than the threshold value.

5. The method of claim 1, wherein the subset of the n bins comprises third through n-1$^{th}$ bins of the n bins, the encoding the third through n-1$^{th}$ bins comprising encoding the third to n-1$^{th}$ bins in bypass mode.

6. The method of claim 1, further comprising encoding the n$^{th}$ bin of the n bins in bypass mode, the n$^{th}$ bin indicating a sign of the MVD.

7. The method of claim 1, wherein MVD is binarized and encoded via the same method as a block vector difference (BVD).

8. The method of claim 1, wherein the MVD comprises a plurality of directional components, the method further comprising generating a plurality of directional component binary strings respectively corresponding to the directional components via binarizing the directional components, the corresponding ordinal bins of the directional component binary strings sharing the same context.

9. The method of claim 1, wherein the at least one bin indicates whether the subset of the n bins are encoded via the second entropy coding operation or a fixed length code.

10. The method of claim 1, further comprising encoding at least a portion of the subset via a truncated Exponential Golomb coding in response to the absolute value of the MVD being less than or equal to the threshold value.

11. A method operable by a video decoder for decoding screen content, the method comprising:
    receiving a bitstream comprising an encoded binary string, the binary string comprising n bins;
    decoding at least one bin of the n bins via a first entropy coding operation, the at least one bin indicating whether an absolute value of a motion vector difference (MVD) is greater than a threshold value, the MVD being a difference between a predicted motion vector and a current motion vector;
    decoding a subset of the n bins via a second entropy coding operation in response to the at least one bin indicating that the absolute value of the MVD is greater than the threshold value, the second entropy coding operation comprising an exponential coding having an order that is greater than one;
    decoding the subset of the n bins using a fixed length code in response to the at least one bin indicating that the absolute value of the MVD is less than or equal to the threshold value; and
    generating the MVD based at least in part on the decoded bins;
    wherein the at least one bin comprises first and second bins, the first bin indicating whether the absolute value of the MVD is greater than zero;
    wherein the subset of the n bins comprises third through n-1$^{th}$ bins of the n bins, and wherein the length of the fixed length code is dependent on the threshold value.

12. The method of claim 11, wherein:
    the first entropy coding operation comprises Context Adaptive Binary Arithmetic Coding (CABAC); and
    the second entropy coding operation comprises an exponential Golomb coding.

13. The method of claim 11, wherein the second bin indicating whether the absolute value of the MVD is greater than the threshold value.

14. The method of claim 11, wherein the MVD is decoded via the same method as a block vector difference (BVD).

15. A device for encoding screen content, comprising:
a memory configured to store at least a portion of the screen content; and
at least one processor in communication with the memory and configured to:
determine a motion vector difference (MVD) between a predicted motion vector and a current motion vector;
generate a binary string comprising n bins via binarizing the MVD;
encode at least one bin of the n bins via a first entropy coding operation;
determine whether an absolute value of the MVD is greater than a threshold value;
encode a subset of the n bins via a second entropy coding operation in response to the absolute value of the MVD being greater than the threshold value, the second entropy coding operation comprising an exponential coding having an order that is greater than one; and
encode the subset of the n bins using a fixed length code in response to the absolute value of the MVD being less than or equal to the threshold value;
wherein the at least one bin comprises first and second bins, the first bin indicating whether the absolute value of the MVD is greater than zero;
wherein the subset of the n bins comprises third through n−1$^{th}$ bins of the n bins, and wherein the length of the fixed length code is dependent on the threshold value.

16. The device of claim 15, wherein:
the first entropy coding operation comprises Context Adaptive Binary Arithmetic Coding (CABAC); and
the second entropy coding operation comprises an exponential Golomb coding.

17. The device of claim 15, wherein the second bin indicates whether the absolute value of the MVD is greater than the threshold value.

18. The device of claim 15, wherein the at least one processor is further configured to binarize and encode the MVD via the same method as a block vector difference (BVD).

19. The device of claim 15, wherein the at least one bin indicates whether the subset of the n bins are encoded via the second entropy coding operation or a fixed length code.

20. The device of claim 15, wherein the at least one processor is further configured to encode of the subset of the n bins via encoding at least a portion of the subset via a truncated Exponential Golomb coding in response to the absolute value of the MVD being less than or equal to the threshold value.

21. A device for decoding screen content, comprising:
a memory configured to store at least a portion of the screen content; and
at least one processor in communication with the memory and configured to:
receive a bitstream comprising an encoded binary string, the binary string comprising n bins;
decode at least one bin of the n bins via a first entropy coding operation, the at least one bin indicating whether an absolute value of a motion vector difference (MVD) is greater than a threshold value, the MVD being a difference between a predicted motion vector and a current motion vector;
decode a subset of the n bins via a second entropy coding operation in response to the at least one bin indicating that the absolute value of the MVD is greater than the threshold value, the second entropy coding operation comprising an exponential coding having an order that is greater than one;
decode the subset of the n bins using a fixed length code in response to the at least one bin indicating that the absolute value of the MVD is less than or equal to the threshold value; and
generate the MVD based at least in part on the decoded bins;
wherein the at least one bin comprises first and second bins, the first bin indicating whether the absolute value of the MVD is greater than zero;
wherein the subset of the n bins comprises third through n−1$^{th}$ bins of the n bins, and wherein the length of the fixed length code is dependent on the threshold value.

22. The device of claim 21, wherein:
the first entropy coding operation comprises Context Adaptive Binary Arithmetic Coding (CABAC); and
the second entropy coding operation comprises an exponential Golomb coding.

23. The device of claim 21, wherein the second bin indicating whether the absolute value of the MVD is greater than the threshold value.

24. The device of claim 21, wherein the length of the fixed length code is equal to the threshold value.

25. The device of claim 21, wherein the at least one processor is further configured to decode the MVD via the same method as a block vector difference (BVD).

* * * * *